United States Patent Office 3,531,471
Patented Sept. 29, 1970

3,531,471
PROCESS FOR PREPARING N-VINYL COMPOUNDS
Robert Hartwimmer, Hofheim, Taunus, and Wolfram Schwiersch, Frankfurt am Main, Germany, assignors to Farbwerke Hoechst Aktiengesellschaft vormals Meister Lucius & Bruning, Frankfurt am Main, Germany, a corporation of Germany
No Drawing. Filed Mar. 10, 1966, Ser. No. 533,228
Claims priority, application Germany, Mar. 20, 1965, F 45,580
The portion of the term of the patent subsequent to Apr. 9, 1985, has been disclaimed
Int. Cl. C07d 41/06
U.S. Cl. 260—239.3          2 Claims

ABSTRACT OF THE DISCLOSURE

An improved process has been provided for preparing a N-vinyl compound of the formula

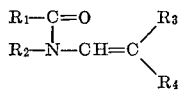

in which $R_1$ and $R_2$ each represents a lower alkyl group or in which $R_1$ and $R_2$ represent joined and alkylene group having 3 to 11 carbon atoms and $R_3$ and $R_4$ each represents a hydrogen atom or a lower alkyl group from N-(α-alkoxyalkyl) compound precursor of the formula

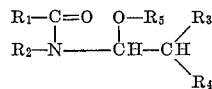

in which $R_1$, $R_2$, $R_3$, and $R_4$ have the meanings defined above and $R_5$ represents a lower alkyl group, said process being carried out by heating the precursor to a temperature between about 50° and 200° C. in the presence of a nonvolatile, insoluble, weakly acidic substance having a high surface area, wherein the weakly acidic substance is selected from the group consisting of oxides of aluminum, beryllium, zirconium, tungsten; phosphates of calcium, aluminum boron and tungsten; and aluminum silicate in the H form. The improvement consists of performing the reaction in a gaseous phase.

---

It has been found that N-vinyl compounds of the general formula

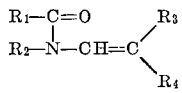

wherein $R_1$ and $R_2$ each represents an alkyl group or $R_1$ and $R_2$ are linked with each other in a ring so as to form an alkylene group containing 3 to 11 carbon atoms, which may be substituted by alkyl groups, and $R_3$ and $R_4$ each represents a hydrogen atom or an alkyl group, can be obtained by catalytically splitting N-(α-alkoxyalkyl) compounds of the general formula

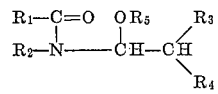

wherein $R_1$, $R_2$, $R_3$ and $R_4$ have the meanings given above and $R_5$ represents an alkyl group, by heating in the gaseous phase in the presence of weakly acid nonvolatile insoluble substances having a high surface area.

When operating in the gaseous phase it is possible to treat the starting and final products in a very mild manner, since always a small proportion only of the N.O-acetals is passed to the evaporator and to the contact furnace containing the splitting catalyst, and the vinyl compounds are removed from the catalyst zone and are cooled just after having been formed. The short thermal strain and the reduced residence time on contact are the reasons why practically no side-reactions occur according to the process of the present invention and thus the N-vinyl amides are generally obtained with yields superior to those obtained according to the process of the main patent.

The following compounds may be used according to the process of the present invention, as starting compounds capable of being split:

N-(α-alkoxy-alkyl)-lactams such as
N-(α-methoxy-ethyl)-pyrrolidone-(2),
N-(α-ethoxy-ethyl)-pyrrolidone-(2),
N-(α-i-propoxy-ethyl)-pyrrolidone-(2),
N-(α-tert.-butoxyethyl)-pyrrolidone-(2),
N-(α-ethoxy-ethyl)-piperidone-(2),
N-(α-n-butoxy-ethyl)-piperidone-(2),
N-(α-methoxy-ethyl)-caprolactam,
N-(α-isobutoxy-ethyl)-caprolactam,
N-(α-amyloxy-ethyl)-caprolactam,
N-(α-ethoxy-ethyl)-capryllactam,
N-(α-methoxy-ethyl)-lauryl-lactam,
N-(α-methoxy-propyl)caprolactam,
N-(α-methoxy-β-methyl-n-propyl)-pyrrolidone-(2) or
N-(α-methoxy-β-methyl-n-propyl)-caprolactam, compounds substituted in the lactam ring such as, for example, N-(α-methoxy-ethyl)-5.5-dimethyl piperidone-(2),
N-(α-ethoxy-ethyl)-4-ethyl-pyrrolidone-(2) or
N-(α-methoxy-ethyl)-3.5-dimethyl caprolactam, and
N-(α-alkoxy-alkyl)-N-alkyl-carboxylic acid amide such as for example N-(α-methoxy-ethyl)-N-methyl-acetamide,
N-(α-ethoxy-ethyl)-N-methyl-acetamide,
N-(α-i-propoxy-ethyl)-N-ethyl-acetamide,
N-(α-methoxy-ethyl)-N-propyl-acetamide,
N-(α-methoxy-ethyl)-N-methyl-propionamide,
N-(α-ethoxy-ethyl)-N-ethyl-propionamide,
N-(α-methoxy-propyl)-N-methyl-acetamide, or
N-(α-ethoxy-β-methyl-n-propyl)-N-methyl-acetamide.

The N-(α-alkoxy-alkyl) compounds used as starting compounds are easy to prepare in very good yields by reacting open-chain or cyclic carboxylic acid amides which carry, on the nitrogen atom, and hydrogen atom capable of being substituted, with acetals or hemiacetals the aldehyde component of which contains more than 1 carbon atom, or with acetal- or hemiacetal-forming components in the presence of acid catalysts.

As catalysts there are suitable nonvolatile, insoluble substances of a high surface area, which have either their own acid reaction, such as aluminum phosphate or boron phosphate, or those which have an acid reaction due to a preliminary treatment, such as acid active aluminum oxides, zirconium dioxide and aluminosilicates in the H-form being capable of exchanging cations, such as zeolites.

Further weakly acid compounds such as calcium dihydrogenophosphate, wolfram or molybdenum polyphosphates as well as oxides of beryllium, zirconium and wolfram may also be mentioned.

It is suitable to apply the above-mentioned catalysts to a chemically inert carrier material, for example kieselguhr, charcoal or pumice powder, and to use them as granulated substance or as rodlets which have been extruded and then broken, for charging the contact furnaces. A preferable method of preparation is the careful mixing of the catalysts present as powder with the pulverulent carrier in dry form in a mixer and the subsequent addition of such an amount of water that the substance can easily be pressed into noodles by means of an extrusion press. The noodles are freed from water in vacuo at about 150° C. for 24 hours, they are dried and broken, the breaking dust is removed from them and the rodlets are filled into the contact tubes. The catalysts described above have an excellent activity and a long life.

It is advantageous to make sure that the temperature of the splitting zone generally ranges between 50 and 200° C., preferably between 100 and 150° C. The optimum temperature range is principally determined by the activity of the catalyst used, by the nature and the stability of the starting compounds to be split and by the residence time within the splitting zone.

The reaction can be carried out under slight excess pressure or under normal pressure, it is, however, advantageous to operate under reduced pressure.

It is advantageous to carry out the process by heating the contact tube in the tube furnace to the optimum splitting temperature as ascertained by preliminary experiments, and by heating the evaporator to a temperature which exceeds the afore-mentioned one by about 20° C. By means of a dosing plant, the N.O-acetal is introduced into the evaporator. The evaporated material is suitably passed through the splitting tube with the aid of an inert gas such as nitrogen. The pressure within the whole apparatus is chosen in such a manner that the N.O-acetal evaporates in the evaporator with a sufficient speed and the temperature of the contact zone is by some degrees above the pressure-dependent boiling point of the N.O-acetal. The split products are condensed on coolers and in cooling traps and subsequently subjected to fractional distillation. In a continuous producing method on an industrial scale, it is however suitable to introduce the split products just after having discharged from the splitting furnace, while still gaseous, to a fractionating column being under the same pressure. The alcohol which has been split off, may be used again for preparing the starting compound.

It is known that N-(α-alkoxyethyl)-lactams can be split into alcohols and N-vinyllactams by heating them to high temperatures (see Isvestija Akadimii Nauk SSR Chimija, 1959, pages 892 to 895). In view of the very high splitting temperatures ranging from 200 to 300° C. to be applied, and the relatively low splitting speed, the known process leads to considerable losses of monomeric N-vinyllactam, particularly when larger amounts of substances are used, since a considerable part of it polymerizes and becomes resinous during the continuous thermal treatment, in spite of the presence of stabilizers.

In comparison with the known process, the new process has the advantage of splitting the starting compounds at a several times higher reaction speed even at temperatures which are by 100–150° C. lower, owing to the selective action of the splitting catalysts. The N-vinyl compounds are obtained in almost quantitative yield due to the smooth and mild procedure of splitting.

The N-vinyl compounds obtainable according to the process of the present invention, are valuable intermediate products and are particularly suitable for homopolymerization and copolymerization.

The following examples serve to illustrate the invention, but they are not intended to limit it thereto:

EXAMPLE 1

For carrying out the splitting process, an apparatus is used, which consists of a 250 ml. evaporating flask provided with a thermometer, a nitrogen capillary, a device for dosing the N.O-acetal and a short insulated bent tube connecting the whole with a vertical reaction tube of a length of 800 mm. and a diameter of 55 mm. The reaction tube is mantled with an electrically heated tube furnace, carries a thermometer installed in axial position, and ends in a vessel for collecting the split products. The apparatus is connected with an intensive cooler and two cooling traps cooled with Dry Ice. Finally, the apparatus has a manometer and plants for generating the reduced pressure required. Safety valves are installed at the in- and outlet of the furnace.

The catalyst prepared from a mixture of kieselguhr and aluminum phosphate in a ratio of 2:1, is filled into the reaction tube in admixture with Raschig-rings (400 ml. of Raschig rings of a diameter of 2 mm. calculated on 800 ml. of the catalyst). The apparatus is then heated while passing nitrogen through it.

The evaporator is heated to a temperature ranging from 150 to 160° C., the splitting tube is heated to 145° C. and the pressure is regulated as to amount to 50 mm. of mercury. The evaporator is subsequently charged with 1,000 grams (5.4 mols) of N-(α-isobutoxy-ethyl)-pyrrolidone-(2) in a dose of 60 grams (324 millimols) per hour. A weak stream of nitrogen carries the evaporated N.O-acetal through the contact zone. The split products are condensed in several steps and are subsequently subjected to fractional distillation.

The fractional distillation of the condensates (987 grams) yields, in addition to 351 grams (4.73 mols) of isobutanol of a refractive index of $n_D^{20}=1.3957$, 521 grams (4.7 mols) of N-vinyl-pyrrolidone-(2) having a boiling point of 90–91° C. at a pressure of 10 mm. of mercury and a refractive index of $n_D^{20}=1.5110$. Furthermore, 113 grams of the unchanged starting compound is obtained. This result corresponds to a reaction rate of 88.6% and a yield of N-vinylpyrrolidone-(2) of 98% of the theory.

EXAMPLE 2

The apparatus described in Example 1 is used. As splitting catalyst are used 800 ml. of a granulated substance prepared from 2 parts by weight of kieselguhr and 1 part by weight of acid aluminum oxide according to Woelm (anionotropic) in admixture with 400 ml. of Raschig rings (of a diameter of 2 mm.). The evaporator is heated to 150° C. and the contact zone is heated to a temperature ranging from 140 to 145° C. Within the apparatus, a pressure of 100 mm. of mercury is maintained and the evaporator is charged with 477 grams (3.3 mols) of N-(α-ethoxyethyl)-N-methyl-acetamide at a reaction rate of 68 grams (470 millimols) per hour. Nitrogen is allowed to stream through the apparatus for carrying the evaporated N.O-acetal into the contact zone. The reaction products are collected in the separator and in the cooling traps and are subjected to fractional distillation when the splitting process is complete.

There are obtained 109 grams (2.37 mols) of ethanol, 234 grams (2.36 mols) of N-vinyl-N-methylacetamide having a boiling point of 64° C. at a pressure of 18 mm. of mercury and a refractive index of $n_D^{20}=1.4830$, and 120 grams of unchanged N.O-acetal. This result corresponds to a reaction rate of 75% and a yield of N-vinyl-N-methylacetamide of 96% of the theory.

We claim:
1. In the process for preparing a N-vinyl compound of the formula

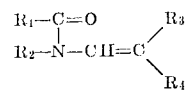

in which $R_1$ and $R_2$ each represents a lower alkyl group or in which $R_1$ and $R_2$ represent joined an alkylene group having 3 to 11 carbon atoms and $R_3$ and $R_4$ each represents a hydrogen atom or a lower alkyl group from N-(α-alkoxy-alkyl) compound precursor of the formula

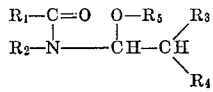

in which $R_1$, $R_2$, $R_3$, and $R_4$ have the meanings defined above and $R_5$ represents a lower alkyl group; said process being carried out by heating the precursor to a temperature between about 50° and 200° C. in the presence of a nonvolatile, insoluble, weakly acidic substance having a high surface area, wherein the weakly acidic substance is selected from the group consisting of oxides of aluminum, beryllium, zirconium, tungsten; phosphates of calcium, aluminum, boron and tungsten; and aluminum silicate in the H form, the improvement of which comprises performing the reaction in a gaseous phase.

2. A process as claimed in claim 1, wherein the reaction is carried out at a temperature between 100° and 150° C.

References Cited

UNITED STATES PATENTS 3,336,369   8/1967   Schwiersch et al. _____ 260—482
3,377,340   4/1968   Hartwimmer et al. __ 260—239.3

OTHER REFERENCES

Shostakovski et al., Izvest. Akad. Nauk SSR., Otdel Khim Khim. Nauk (1959) pp. 892–5.

HENRY R. JILES, Primary Examiner

R. T. BOND, Assistant Examiner

U.S. Cl. X.R.

260—326.5, 561, 294.7; 252—463, 455, 437, 475, 461, 467, 432